(12) United States Patent
Lim

(10) Patent No.: US 8,833,719 B2
(45) Date of Patent: Sep. 16, 2014

(54) SPRINKLER CLAMP

(76) Inventor: Gyaun Bin Lim, Bucheon (KR)

(*) Notice: Subject to any disclaimer, the term of this patent is extended or adjusted under 35 U.S.C. 154(b) by 201 days.

(21) Appl. No.: 13/992,868

(22) PCT Filed: Feb. 24, 2011

(86) PCT No.: PCT/KR2011/001298
§ 371 (c)(1), (2), (4) Date: Jun. 10, 2013

(87) PCT Pub. No.: WO2011/105831
PCT Pub. Date: Sep. 1, 2011

(65) Prior Publication Data
US 2013/0284862 A1    Oct. 31, 2013

(30) Foreign Application Priority Data

Feb. 25, 2010 (KR) .................. 10-2010-0017239
Feb. 22, 2011 (KR) .................. 10-2011-0015358

(51) Int. Cl.
*B42F 13/00* (2006.01)
(52) U.S. Cl.
USPC ............. 248/343; 248/226.11; 248/230.1; 248/341.41; 248/342
(58) Field of Classification Search
CPC ........... A62C 35/86; A62C 35/58; F16L 3/02; E04B 9/006
USPC ............. 248/72, 62, 75, 342, 343, 341.41, 248/226.11, 230.1; 239/203, 200, 201
See application file for complete search history.

(56) References Cited

U.S. PATENT DOCUMENTS 3,341,909 A * 9/1967 Havener ................ 24/486
7,594,615 B1 * 9/2009 Moore .................. 239/203
8,534,625 B2 * 9/2013 Heath et al. ............ 248/226.11
(Continued)

FOREIGN PATENT DOCUMENTS

| JP | 06337082 | 6/1994 |
| JP | 11063310 | 3/1999 |
| KR | 20080033823 | 4/2008 |
| KR | 101014385 | 2/2011 |

OTHER PUBLICATIONS

International Search Report—PCT/KR2011/001298 dated Nov. 29, 2011.

*Primary Examiner* — Amy J Sterling
(74) *Attorney, Agent, or Firm* — Cantor Colburn LLP

(57) ABSTRACT

The present invention relates to a clamp for fastening a sprinkler to a support mounted on a ceiling. The clamp is formed by bending an iron piece into a square box shape, wherein the left and right sides of the square box are open such that the support is pushed and inserted into the space formed between the upper and lower surfaces of the square box. The clamp comprises: coupling openings formed through the upper and lower surfaces of the clamp such that the sprinkler is inserted into the coupling openings; an inlet/outlet opening formed by cutting out one of said left and right sides such that the sprinkler can be inserted into the coupling openings; reinforcement ribs formed around the coupling openings formed through the upper and lower surfaces of the clamp; a bolt hole formed through the front surface of the clamp, in front of the coupling openings, such that a bolt can be fastened into the bolt hole; said bolt which fastened into the bolt hole; and a tight contact piece interposed between the bolt and the sprinkler inserted into the coupling openings.

6 Claims, 7 Drawing Sheets

(56) References Cited

U.S. PATENT DOCUMENTS

| | | | |
|---|---|---|---|
| 2005/0139743 A1* | 6/2005 | Shim | 248/342 |
| 2008/0083852 A1* | 4/2008 | Oh | 248/73 |
| 2011/0094760 A1* | 4/2011 | Im | 169/51 |
| 2013/0220649 A1* | 8/2013 | Silcox et al. | 169/51 |
| 2013/0320176 A1* | 12/2013 | Hickle et al. | 248/343 |

* cited by examiner

SPRINKLER CLAMP

TECHNICAL FIELD

The present invention relates to a sprinkler clamp to conveniently and firmly fix a sprinkler to a support mounted on a ceiling.

BACKGROUND ART

In general, a sprinkler is fire-fighting equipment that is mounted on a ceiling to put out a fire.

A unit to fix such a sprinkler to the ceiling includes a frame installed within the ceiling, a support connected to the frame, and a clamp to fix the sprinkler to the support.

The sprinkler clamp is formed in a square box shape, the left and right side surfaces of which are opened, using an iron sheet so that the support may be pushed and inserted into a space formed between the upper and lower surfaces of the sprinkler clamp, coupling holes into which the sprinkler is inserted are formed by vertically perforating the centers of the upper and lower surfaces of the sprinkler clamp, a bolt hole to which a bolt is fastened is formed at the center of the front surface of the sprinkler clamp, and the bolt is fastened to the bolt hole so as to push and press the sprinkler to the support. Further, in order to easily push and insert the sprinkler into the coupling holes, an entrance is formed by cutting one of the left and right side surfaces of the sprinkler clamp in a direction toward the coupling holes.

DISCLOSURE

Technical Problem

Therefore, the present invention has been made in view of the above problems, and it is an object of the present invention to provide a sprinkler clamp which prevents lowering of tight contact of a sprinkler with the sprinkler clamp caused by concentration of pressing force only at the end a bolt when the sprinkler is fastened with the bolt.

It is another object of the present invention to provide a sprinkler clamp which prevents widening or warpage of the sprinkler clamp when a sprinkler inserted into coupling holes is fastened with a bolt due to an entrance formed by cutting one of the left and right side surfaces of the sprinkler clamp.

It is yet another object of the present invention to provide a sprinkler clamp which prevents easy separation of a sprinkler from coupling holes when the width of an entrance is equal to the diameter of the coupling holes, and prevents difficulty in entrance and exit of the sprinkler into and out of the coupling holes when the width of the entrance is less than the diameter of the coupling holes.

Technical Solution

In accordance with an aspect of the present invention, the above and other objects can be accomplished by the provision of a sprinkler clamp formed in a square box shape, the side surfaces of which are opened, by bending an iron sheet so that a support may be pressed and inserted into a space formed between the upper and the lower surfaces of the sprinkler clamp, and including coupling holes formed through the upper and lower surfaces of the sprinkler clamp so that a sprinkler is coupled with the coupling holes, an entrance formed by cutting one side surface of the sprinkler clamp so as to insert the sprinkler into the coupling holes, reinforcement ribs formed around the coupling holes of the upper and lower surfaces of the sprinkler clamp, a bolt hole formed through the front surface of the sprinkler clamp in front of the coupling holes, a bolt fastened to the bolt hole, and a tight contact piece located between the bolt and the sprinkler inserted into the coupling holes.

A guide cut to guide the sprinkler to the coupling holes and an anti-separation projection to prevent separation of the sprinkler inserted into the coupling holes from the coupling holes may be formed at both front cut ends of the entrance.

The reinforcement ribs may be formed in a convex C or ⌐ shape by press forming.

A projection bent to be put over the upper surface of the sprinkler clamp around the coupling holes may be formed at the upper end of the tight contact piece.

Anti-skid protrusions may be formed on the inner surface of the tight contact piece.

Advantageous Effects

In a sprinkler clamp in accordance with the present invention, when a bolt is tightened, a tight contact piece presses a sprinkler, and thus tight contact of the sprinkler with the sprinkler clamp is improved. Further, a projection formed at the upper end of the tight contact piece is put over the upper surface of the sprinkler clamp so that the tight contact piece does not slip down, and thus the sprinkler clamp is more conveniently used. Moreover, anti-skid protrusions are formed on the inner surface of the tight contact piece, and use of the tight contact piece provided with the anti-skid protrusions together with the sprinkler provided with anti-skid grooves formed on the outer surface thereof further improves tight contact of the sprinkler with the sprinkler clamp.

Further, in the sprinkler clamp in accordance with the present invention, reinforcement ribs protruding from the upper and lower surfaces of the sprinkler clamp around the coupling holes prevent the sprinkler clamp from widening or warping and thus improve stability in fixing of the sprinkler.

Further, a guide cut to guide the sprinkler to the coupling holes and an anti-separation projection to prevent the sprinkler from being easily separated from the coupling holes are formed at an entrance formed at one side of the coupling holes and thus improve convenience of the sprinkler clamp and stability in fixing of the sprinkler to the sprinkler clamp.

DESCRIPTION OF DRAWINGS

The above and other objects, features and other advantages of the present invention will be more clearly understood from the following detailed description taken in conjunction with the accompanying drawings, in which:

FIG. 3 is a plan view illustrating the function of a reinforcement rib to which FIG. 2 is applied;

FIG. 6 is a plan view illustrating the function of an entrance to which FIG. 2 is applied;

BEST MODE

Figure 1:
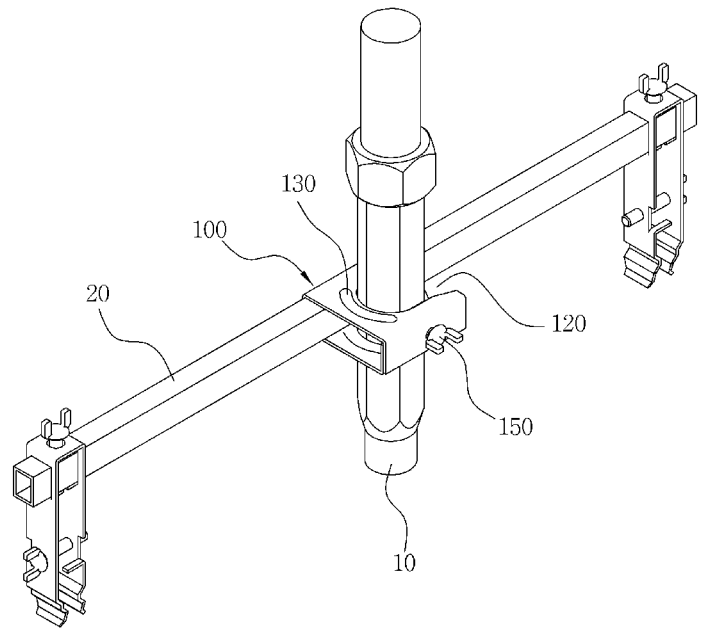
FIG. 1 is a perspective view illustrating the use state of a sprinkler clamp in accordance with the present invention.

Now, preferred embodiments of the present invention will be described in detail with reference to the annexed drawings.

A sprinkler clamp 100 in accordance with one embodiment of the present invention, as shown in FIGS. 1 to 13, includes coupling holes 110 with which a sprinkler 10 is coupled, an entrance 120 to insert the sprinkler 10 into the coupling holes 110, reinforcement ribs 130 formed around the coupling holes 110, a bolt hole 140 formed in front of the coupling holes 110, a bolt 150 fastened to the bolt hole 140, and a tight contact piece 160 located between the bolt 150 and the sprinkler 10.

Figure 2:
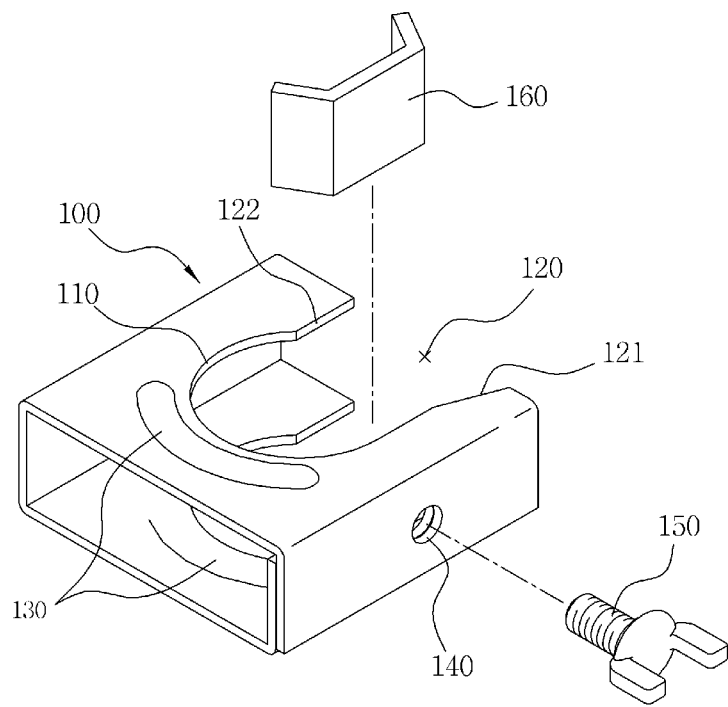
FIG. 2 is a perspective view of a sprinkler clamp in accordance with one embodiment of the present invention.
Figure 3:
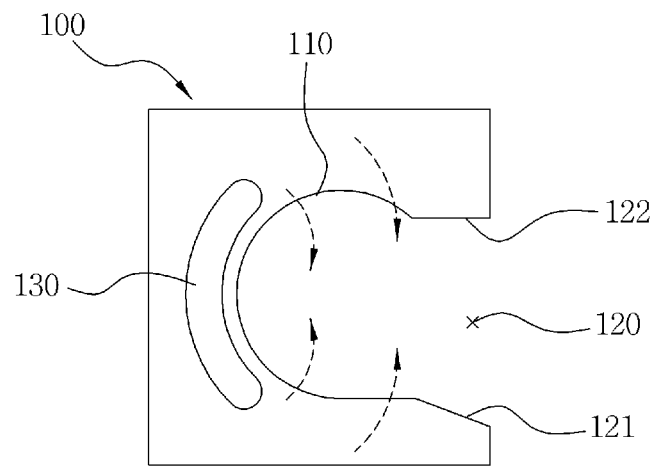
Figure 4:
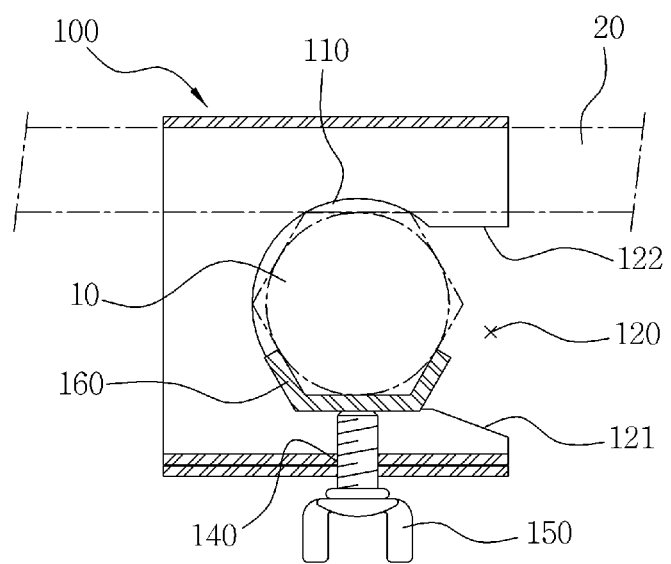
FIG. 4 is a transversal-sectional view of the sprinkler clamp of FIG. 2.
Figure 5:
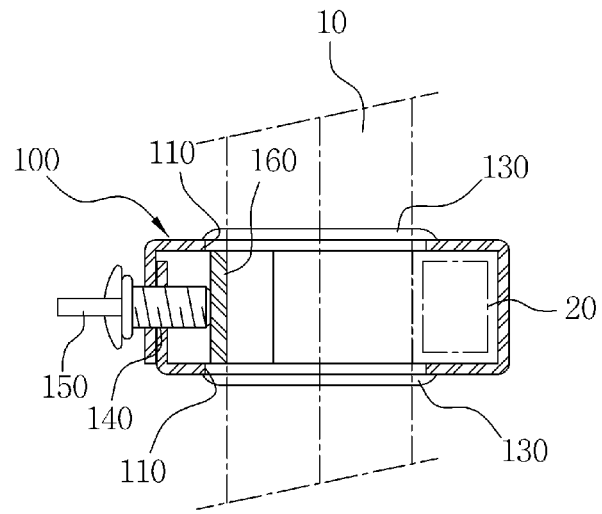
FIG. 5 is a longitudinal-sectional view of the sprinkler clamp of FIG. 2.

The sprinkler clamp 100 is formed in a square box shape, the left and right side surfaces of which are opened, by bending an iron sheet so that a support 20 may be pushed and inserted into a space formed between the upper and the lower surfaces of the sprinkler clamp 100, as shown in FIGS. 1 and 2. For example, the sprinkler clamp 100 is formed by bending an iron sheet having a designated thickness forward and backward such that both ends of the iron sheet overlap at the front portion of the sprinkler clamp 100. Therefore, both ends of the iron sheet overlap, thus forming the front surface of the sprinkler clamp 10.

The coupling holes 110 are formed by perforating the upper and lower surfaces of the sprinkler clamp 100 so that the sprinkler 10 may be inserted into the coupling holes 110. The coupling holes 110 may be formed in the same shape as the cross-sectional shape of the sprinkler 10, and may be formed in an almost circular shape so as to be universally used in various kinds of sprinklers 10.

The entrance 120 is formed by cutting one of the left and right side surfaces of the sprinkler clamp 100 in a direction toward the coupling holes 110. That is, when the sprinkler 10 is inserted into the coupling holes 110, the sprinkler 10 is not inserted into the coupling holes 110 in the downward direction from the top, but is inserted into the coupling holes 110 in the sideward direction through the entrance 120.

Figure 6:
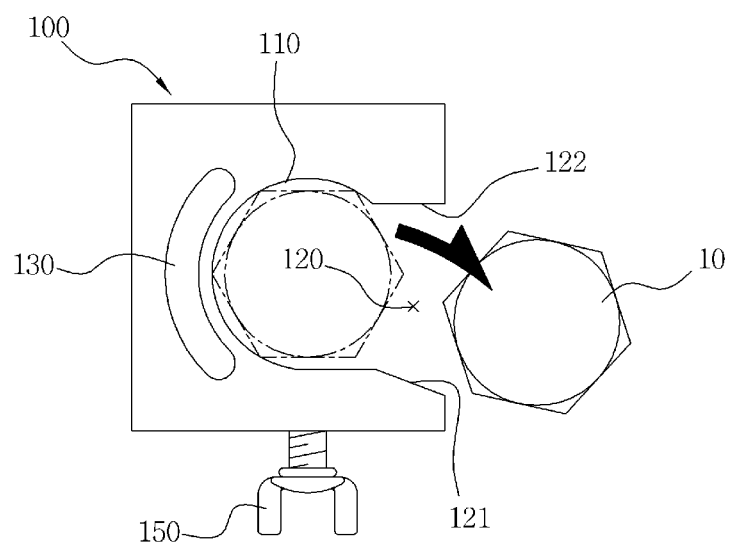

A guide 121 cut to guide the sprinkler 10 to the coupling holes 110 and an anti-separation projection 122 to prevent separation of the sprinkler 10 from the coupling holes 110 are formed at both front cut ends of the entrance 120. That is, as shown in FIG. 6, the guide 121 is opened to the outside of the entrance 120 so as to easily push and insert the sprinkler 10 into the coupling holes 110, and the anti-separation projection 122 protrudes to the inside of the entrance 120 so as to prevent the sprinkler 10 inserted into the coupling holes 110 and tightly contacting the support 20 from being separated from the coupling holes 110 in a direction toward the entrance 120.

The reinforcement ribs 130 are formed around the coupling holes 110 of the upper and lower surfaces of the sprinkler clamp 100, and prevent the sprinkler clamp 100 from widening or warping. That is, when the bolt 150 is tightened under the condition that the sprinkler 10 is inserted into the coupling holes 110, force is applied in a direction of widening the coupling holes 110 including the entrance 120 by the reverse action of the bolt 150. At this time, if tightening force is increased, the sprinkler clamp 100 is widened or warped. The reinforcement ribs 130 reduce such widening and warpage of the sprinkler clamp 100, thus improving stability of the sprinkler clamp 100.

The reinforcement ribs 130 are formed in an upwardly or downwardly convex shape by press forming. The protruding convex rear surfaces of the reinforcement ribs 130 may be flat or concave.

The bolt hole 140 is formed through the front surface of the sprinkler clamp 100 in front of the coupling holes 110 so that the bolt 150 may be fastened into the bolt hole 140. A female screw is formed on the inner surface of the bolt hole 140 so that the bolt 150 may be screw-coupled with the bolt hole 140.

The bolt 150 is fastened into the bolt hole 140, and a bolt which may be easily gripped and tightened by hand, such as a wing bolt, may be used as the bolt 150.

The tight contact piece 160 is located between the bolt 150 and the sprinkler 10 inserted into the coupling holes 110, and tightly contacts the outer surface of the sprinkler 10 so as to surround the outer surface of the sprinkler 10 when the bolt 150 is tightened. Therefore, the rear surface of the tight contact piece 6 may tightly contact the outer surface of the sprinkler 10, and the front surface of the tight contact piece 10 may be flat so that the end of the bolt 150 tightly contacts the front surface of the tight contact piece 10.

Figure 7:
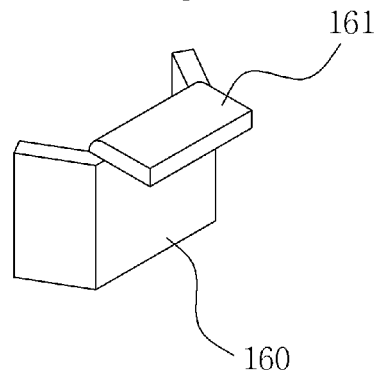
FIG. 7 is a perspective view of a sprinkler clamp in accordance with another embodiment of the present invention.
Figure 8:
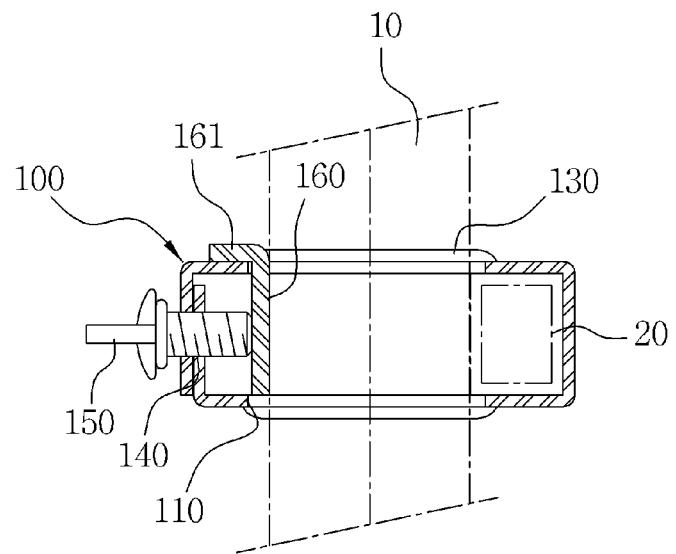
FIG. 8 is a longitudinal-sectional view of the sprinkler clamp to which a tight contact piece of FIG. 7 is applied.

A sprinkler clamp 100 in accordance with another embodiment of the present invention, as shown in FIGS. 7 and 8, includes a projection 161 formed at the upper end of a tight contact piece 160 and bent to be put over the upper surface of the sprinkler clamp 100 around coupling holes 110. That is, the projection 161 is formed at the upper end of the tight contact piece 160 so as to reduce inconvenience of tightening the bolt 150 under the condition that the tight contact piece 160 is located between the bolt 150 and the sprinkler 10.

Figure 9:
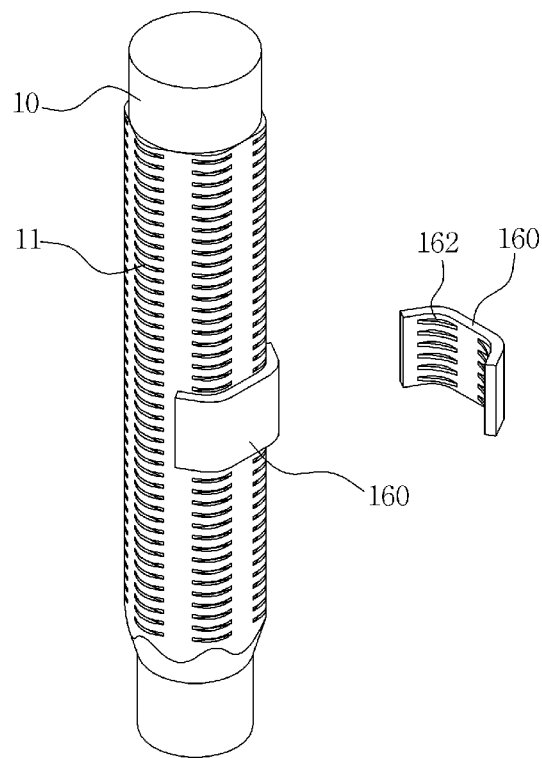
FIG. 9 is a perspective view of a sprinkler clamp in accordance with another embodiment of the present invention.
Figure 10:
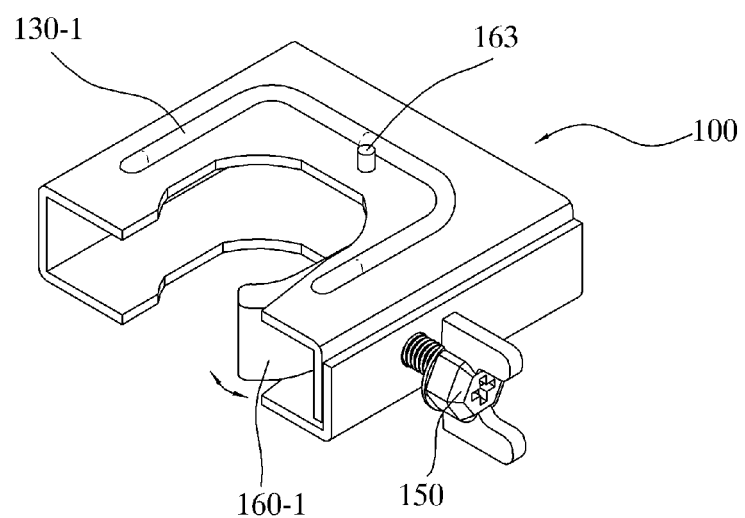
FIG. 10 is a perspective view of a sprinkler clamp having a rotating tight contact piece in accordance with yet another embodiment of the present invention.
Figure 11:
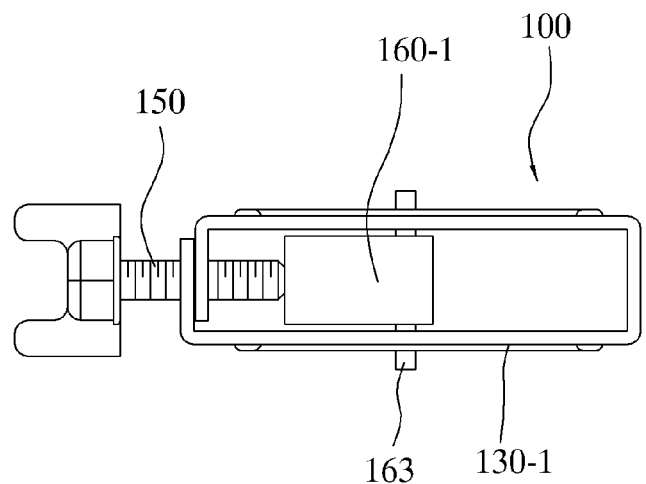
FIG. 11 is a front view of the sprinkler clamp having the rotating tight contact piece in accordance with the embodiment of the present invention.
Figure 12:
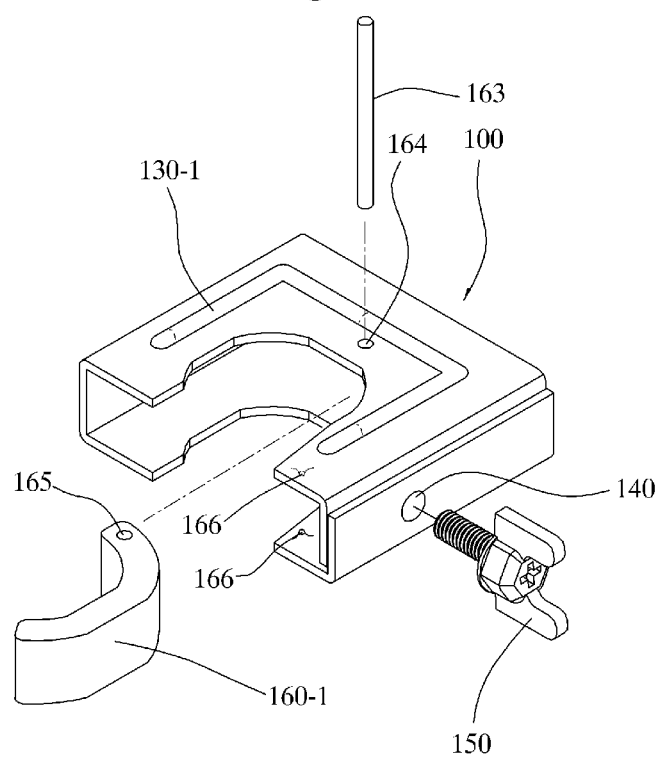
FIG. 12 is an exploded perspective view of the sprinkler clamp having the rotating tight contact piece in accordance with the embodiment of the present invention.
Figure 13:
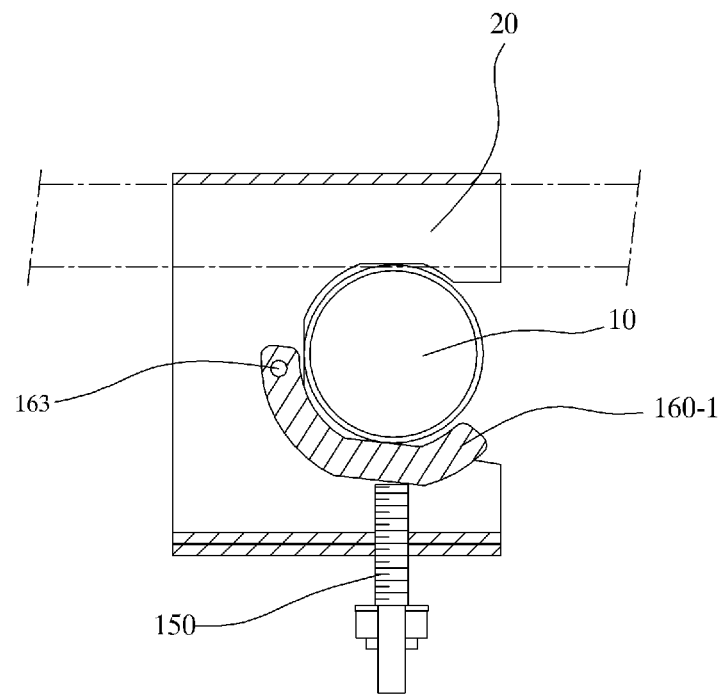
FIG. 13 is a sectional view of the combining state of the sprinkler clamp in accordance with the present invention.

A sprinkler clamp 100 in accordance with another embodiment of the present invention, as shown in FIG. 9, includes anti-skid protrusions 162 on the inner surface of a tight contact piece 160. If a sprinkler 10, provided with anti-skid grooves 11 or protrusions formed on the outer surface thereof, is used, the anti-skid protrusions 162 and the anti-skid grooves 11 prevent the tight contact piece 160 and the sprinkler 10 from being skid on each other, thus stably achieving tight contact between the tight contact piece 160 and the sprinkler 10.

In the above-described configuration of the sprinkler clamp 100 in accordance with the present invention, when the bolt 150 is tightened, the tight contact piece 160 presses the sprinkler 10, and thus tight contact of the sprinkler 10 with the sprinkler clamp 100 is improved. Further, the projection 161 formed at the upper end of the tight contact piece 160 is put over the upper surface of the sprinkler clamp 100 so that the tight contact piece 160 does not slip down, and thus the sprinkler clamp 100 is more conveniently used. Moreover, the anti-skid protrusions 162 are formed on the inner surface of the tight contact piece 160, and use of the tight contact piece 160 provided with the anti-skid protrusions 162 formed on the inner surface thereof together with the sprinkler 10 provided with the anti-skid grooves 111 formed on the outer surface thereof further improves tight contact of the sprinkler 10 with the sprinkler clamp 100.

Further, the reinforcement ribs 130 protruding from the upper and lower surfaces of the sprinkler clamp 100 around the coupling holes 110 prevent the sprinkler clamp 100 from widening or warping and thus improve stability in fixing of the sprinkler 10 to the sprinkler clamp 100, and the guide to guide the sprinkler 10 to the coupling holes 110 and the anti-separation projection 122 to prevent the sprinkler 10 from being easily separated from the coupling holes 110 are formed at the entrance 120 formed at one side of the coupling holes 110 and thus improve convenience of the sprinkler clamp 100 and stability in fixing of the sprinkler 10 to the sprinkler clamp 100.

A sprinkler clamp 100 in accordance with yet another embodiment of the present invention, as shown in FIGS. 10 to 13, includes a through hole 164 to rotatably fix a tight contact piece 160-1, and the tight contact piece 160-1 is mounted on the surface of the sprinkler clamp 100 by inserting a pivot pin 163 into the through hole 164. Therefore, when a sprinkler 10 is fixed, a bolt 150 is tightened, and thus, the sprinkler clamp 100 is easily and conveniently operated.

The tight contact piece 160-1 includes a pivot pin hole 165 fixing the tight contact piece 160-1 to the sprinkler clamp 100 using the pivot pin 163 to rotate the tight contact piece 160-1 about the pivot pin 163 serving as a pivot, and is located between the bolt 150 and the sprinkler 10 inserted into the coupling holes 110.

Protrusions 166 are provided on the upper and lower surfaces of the sprinkler clamp 100 within a moving section so as to prevent the tight contact piece 160-1 from moving before the sprinkler 10 is mounted on the sprinkler clamp 100. The protrusions 166 are formed on the inner surface of the sprinkler clamp 100 so that the tight contact piece 160-1 does not easily move.

Since an entrance 120 is formed by cutting one of the left and right side surfaces of the sprinkler clamp 100 in a direction toward the coupling holes 110 so that the sprinkler 10 enters and exits the coupling holes 110 through the entrance 120, reinforcement ribs 130-1 are formed so as to prevent the sprinkler clamp 10 from widening and to increase strength of the sprinkler clamp 10. The reinforcement ribs 130-1 are formed in an upwardly or downwardly convex C or ⌐ shape by press forming.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A sprinkler clamp formed in a square box shape, the side surfaces of which are opened, by bending an iron sheet so that a support may be pressed and inserted into a space formed between the upper and the lower surfaces of the sprinkler clamp, the sprinkler clamp comprising:
    coupling holes formed through the upper and lower surfaces of the sprinkler clamp so that a sprinkler is coupled with the coupling holes;
    an entrance formed by cutting one side surface of the sprinkler clamp so as to insert the sprinkler into the coupling holes;
    reinforcement ribs formed around the coupling holes of the upper and lower surfaces of the sprinkler clamp;
    a bolt hole formed through the front surface of the sprinkler clamp in front of the coupling holes;
    a bolt fastened to the bolt hole; and
    a tight contact piece located between the bolt and the sprinkler inserted into the coupling holes,
    wherein a guide cut to guide the sprinkler to the coupling holes and an anti-separation projection to prevent separation of the sprinkler inserted into the coupling holes from the coupling holes are formed at both front cut ends of the entrance.

2. The sprinkler clamp according to claim 1, wherein the reinforcement ribs are formed in a convex C or ⌐ shape by press forming.

3. The sprinkler clamp according to claim 1, wherein a projection bent to be put over the upper surface of the sprinkler clamp around the coupling holes is formed at the upper end of the tight contact piece.

4. The sprinkler clamp according to claim 1, wherein anti-skid protrusions are formed on the inner surface of the tight contact piece.

5. The sprinkler clamp according to claim 1, wherein the tight contact piece includes a pivot pin hole fixing the tight contact piece to the sprinkler clamp using a pivot pin so as to rotate the tight contact piece about the pivot pin serving as a pivot, and the bolt is formed in the opposite direction to the pivot pin so as to push and press the tight contact piece and to fix the sprinkler inserted into the coupling holes.

6. The sprinkler clamp according to claim 4, wherein the tight contact piece includes a pivot pin hole fixing the tight contact piece to the sprinkler clamp using a pivot pin so as to rotate the tight contact piece about the pivot pin used as a pivot, the bolt is formed in the opposite direction to the pivot pin so as to push and press the tight contact piece and to fix the sprinkler inserted into the coupling holes, and protrusions are formed on the upper or lower inner surface of sprinkler clamp so that the tight contact piece does not easily move within the sprinkler clamp.

* * * * *